United States Patent
Congratel et al.

(10) Patent No.: US 9,951,625 B2
(45) Date of Patent: Apr. 24, 2018

(54) TURBINE WHEEL FOR A TURBINE ENGINE

(71) Applicant: SNECMA, Paris (FR)

(72) Inventors: Sébastien Serge Francis Congratel, Moissy Cramayel (FR); Maurice Guy Judet, Moissy Cramayel (FR)

(73) Assignee: SNECMA, Paris (FR)

( * ) Notice: Subject to any disclaimer, the term of this patent is extended or adjusted under 35 U.S.C. 154(b) by 219 days.

(21) Appl. No.: 14/931,474

(22) Filed: Nov. 3, 2015

(65) Prior Publication Data

US 2016/0123153 A1 May 5, 2016

(30) Foreign Application Priority Data

Nov. 4, 2014 (FR) ...................... 14 60649

(51) Int. Cl.
- F01D 5/10 (2006.01)
- F01D 5/22 (2006.01)
- F01D 11/00 (2006.01)
- F01D 5/30 (2006.01)

(52) U.S. Cl.
CPC ............. F01D 5/10 (2013.01); F01D 5/22 (2013.01); F01D 5/3023 (2013.01); F01D 11/006 (2013.01); F05D 2260/30 (2013.01); F05D 2260/96 (2013.01); Y02T 50/671 (2013.01)

(58) Field of Classification Search
CPC . F01D 5/22; F01D 5/10; F01D 11/006; F01D 11/008
See application file for complete search history.

(56) References Cited

U.S. PATENT DOCUMENTS

| 5,924,699 A | * | 7/1999 | Airey | ................. F01D 11/008 277/411 |
| 7,214,034 B2 | * | 5/2007 | Giot | ...................... F01D 5/22 416/193 A |

FOREIGN PATENT DOCUMENTS

| EP | 1 985 810 A1 | 10/2008 |
| EP | 2 551 464 A1 | 1/2013 |
| FR | 2 963 382 A1 | 2/2012 |
| WO | WO 03/102380 A1 | 12/2003 |

* cited by examiner

*Primary Examiner* — Justin Seabe
(74) *Attorney, Agent, or Firm* — Blank Rome LLP

(57) ABSTRACT

A turbine wheel for a turbine engine, comprising a disk carrying blades each having a platform, carrying an impeller connected by a stilt to a root. Each blade comprises an upstream radial wall and a downstream radial wall extending inwards from the platform of the blade. The roots of the blades are engaged into slots on the periphery of the disk, so that the radial walls of the blades and the platforms of the blades are circumferentially arranged end-to-end, and define inter-blade cavities radially inside the platforms, each accommodating an inter-blade sealing and vibration damping member. At least one member comprises an elastically deformable element configured so as to be elastically pre-stressed against the walls of a cavity in the member mounting position.

5 Claims, 2 Drawing Sheets

TURBINE WHEEL FOR A TURBINE ENGINE

BACKGROUND OF THE INVENTION

1. Field of the Invention

The present invention relates to a turbine wheel for a turbine engine, such as an aircraft jet engine or turboprop provided with such a wheel. It also relates to a sealing and vibration damping member intended to be used with a turbine wheel and a turbine engine, as mentioned above.

2. Description of the Related Art

A wheel 10 of a high pressure turbine in a turbine engine, as shown in FIG. 1, comprises a disc 14 carrying blades 16 regularly distributed around the wheel axis and the roots 18 of which are engaged into substantially axial slots of the periphery of the disc 14. The blade roots 18 may be of the fir tree or dovetail section type, and the grooves in the disc 14 have shapes that match those of the blade roots 18 and define teeth or ribs 20 between them.

Each blade 16 comprises an impeller 22 the radially inner end of which is connected to a platform 24, which is itself connected to a root 18 by a stilt 26.

The upstream end and the downstream end of each platform 24 are respectively connected to an upstream radial wall 30 extending radially inwards and to a downstream radial wall 28 extending radially inwards.

In mounting position (FIGS. 1 and 2), the platforms 24 of the blades 16 are circumferentially arranged end-to-end so as to form an inner annular wall for the flowing of primary air from a combustion chamber. Similarly, the upstream 28 and downstream 30 radial walls are arranged opposite each other on the circumference.

Mounting sealing and vibration damping members 32 into inter-blade cavities is known. More particularly, each inter-blade cavity is defined radially outwards by the inner faces of two platforms 24 positioned opposite each other on the periphery, radially inwards by a rib 20 of the disc 14, axially by two transverse upstream 30 and downstream 28 radial walls, the ends of which are positioned opposite each other on the periphery, and circumferentially by the stilts 26 of the blades 16.

Each sealing and vibration damping member 32 is mounted into a cavity and held in position therein by pins 34 protruding in the cavity. In a first known embodiment (FIG. 2), the upstream radial wall and the downstream radial wall of each blade each comprise a pin 34 which radially holds the member 32 inwards, on one side of the stilt 26. In another embodiment, each stilt 26 of a blade comprises a pin 34 on each one of its side faces.

Such pins 34 thus form supports for the members upon stopping of the turbine engine and when mounting the members 32 into the cavities. However, in operation, centrifuge force presses the members 32 against the platforms 24 so that the pins 34 no longer have a holding function.

To reduce the weight of the turbine wheel, omitting the pins 34 mentioned above would be interesting, while ensuring the holding in position of the members 32 upon stopping of the turbine engine and an easy mounting of the members 32 into the cavities.

SUMMARY OF THE INVENTION

The invention more particularly aims at providing a simple, efficient and cost-effective solution to the problems of the prior art disclosed above.

For this purpose, it provides a turbine wheel for a turbine engine, comprising a disk carrying blades each having a platform, carrying an impeller connected by a stilt to a root, with each blade comprising an upstream radial wall and a downstream radial wall extending inwards from the platform of the blade, with the roots of the blades being engaged into slots on the periphery of the disk so that the radial walls of the blades and the platforms of the blades are circumferentially arranged end-to-end, and define inter-blade cavities radially inside the platforms each accommodating an inter-blade sealing and vibration damping member, characterized in that at least one member comprises elastically deformable means which are so configured as to be elastically pre-stressed against the walls of a cavity in said member mounting position.

According to the invention, at least one sealing and vibration damping member is held in position by elastic means and no longer by pins like in the prior art. The pins can thus be omitted and the weight of the turbine wheel can be reduced. The reduction in weight is particularly important when all the members comprise elastically deformable means as above.

According to another characteristic of the invention, the member comprises a flanged edge extending inwards a bottom wall applied to the inner faces of the platforms, with the flanged edge comprising at least two opposite lugs elastically prestressed against opposite faces in front of a cavity.

Adding elastically deformable lugs onto pre-existing members is very simple and may be executed during a maintenance operation for instance.

In a preferred embodiment of the invention, a first lug radially extends inwards relative to an upstream portion of the flanged edge and a second lug radially extends inwards relative to a downstream portion of the flanged edge.

Advantageously, the first lug and the second lug cover the junction between adjacent upstream radial walls and the junction between two adjacent downstream radial walls, respectively. The first and second lugs thus make it possible to enhance sealing between the upstream and downstream radial walls.

The upstream portion and the downstream portion of the flanged edge of the member preferably each comprise two slots radially opening inwards and respectively formed on either side of the first and second lugs. Such slots give a greater flexibility to the lugs, which reduces stresses.

The invention also relates to a turbine engine, such as turbojet or a turboprop, comprising a turbine having at least one turbine wheel of the type disclosed above.

The invention also relates to a sealing and vibration damping member comprising a bottom wall extending in a flanged edge having two opposite flanks and two end portions which join the flanks and which each carry an elastically deformable lug extending opposite the bottom wall from the flanged edge.

BRIEF DESCRIPTION OF THE DRAWINGS

The invention will be better understood, and other details, characteristics and advantages of the invention will appear upon reading the following description given by way of a non-restrictive example while referring to the appended drawings wherein.

DETAILED DESCRIPTION OF THE PREFERRED EMBODIMENTS

Figure 1:
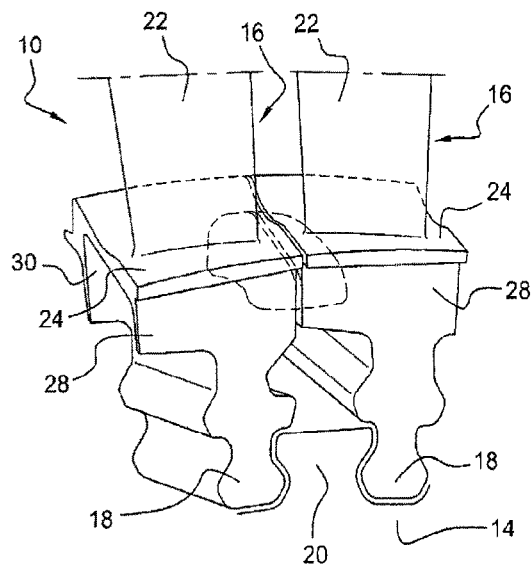
FIG. 1 is a partial schematic view, in perspective, of a turbine wheel according to the known technique.
Figure 2:
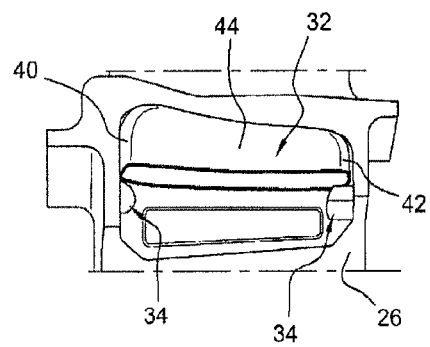
FIG. 2 is a partial and side schematic view, in perspective, of a blade of a turbine wheel accommodating a sealing and vibration damping member.
Figure 3:
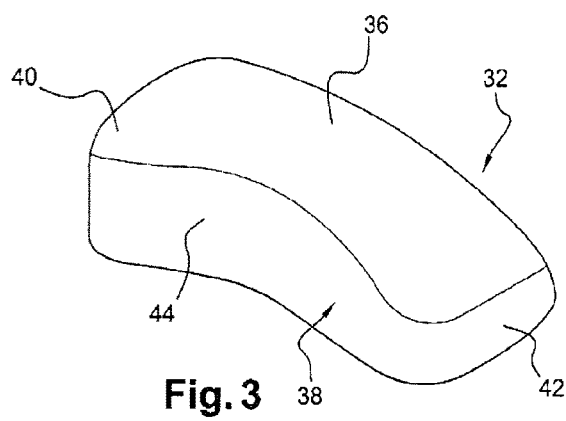
FIG. 3 is a schematic view in perspective of a sealing and vibration damping member according to the prior art.

As FIGS. 1 and 2 have already been described above, reference is now made to FIG. 3 which shows a sealing member according to the known technique, intended to be mounted into an inter-blade cavity.

More specifically, each member 32 comprises a bottom wall 36 which extends on the whole periphery thereof into a flanged edge 38 or peripheral edge, which extends substantially radially inwards. The flanged edge 38 of each member 32 comprises an upstream portion 40 and a downstream portion 42, as well as two side flanks 44 which connect the upstream 40 and downstream 42 portions. Each sealing and vibration damping member 32 has an external shape matching that of the faces of the walls which define an inter-blade cavity, so that the sealing member 32 can come into contact with such faces and provide sealing at the junction between the platforms 24 and the upstream 28 and downstream 30 radial walls.

In the following description relating to the invention, the parts which are similar to those described above have a reference with a number increased by a hundred.

Figure 4:
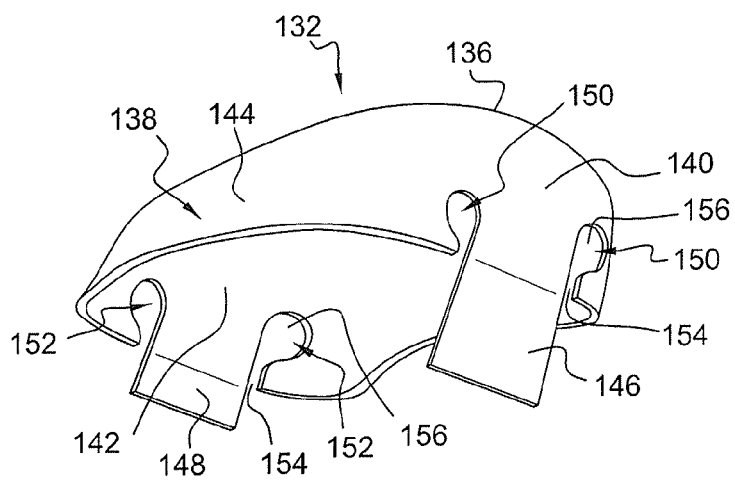
FIG. 4 is a separated schematic view in perspective of a sealing and vibration damping member according to the invention.

According to the invention, each sealing and vibration damping member 132 comprises elastically deformable means. As shown in FIG. 4, the upstream portion 140 of the flanged edge 138 comprises a first lug 146 which extends radially inwards from the flanged edge 138. The downstream portion 142 of the flanged edge 138 comprises a second lug 148 which extends radially inwards from the flanged edge 138.

The upstream portion 140 of the flanged edge 138 comprises a slot 150 on either side of the first lug 146. Similarly, the downstream portion 142 of the flanged edge 138 comprises a slot 152 on either side of the first lug 148. Such slots 150, 152 give them a greater flexibility. As shown in FIG. 4, each slot 150, 152 comprises a portion with a reduced section 154 opening in a portion with a larger section 156 and a substantially circular rounded shape. Such rounded shape 156 makes it possible to distribute the deformation constraints on the lugs 146, 148 over the whole upstream 140 or downstream portion of the flanged edge 138.

Figure 5:
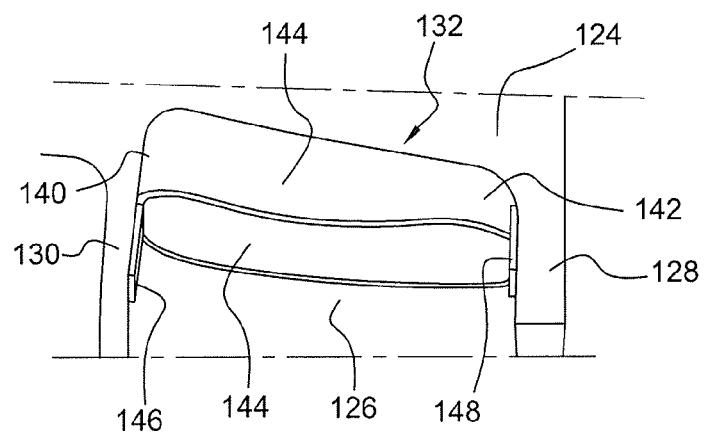
FIG. 5 is a schematic side view in perspective of a sealing and vibration damping member according to the invention accommodated in an inter-blade cavity.
Figure 6:
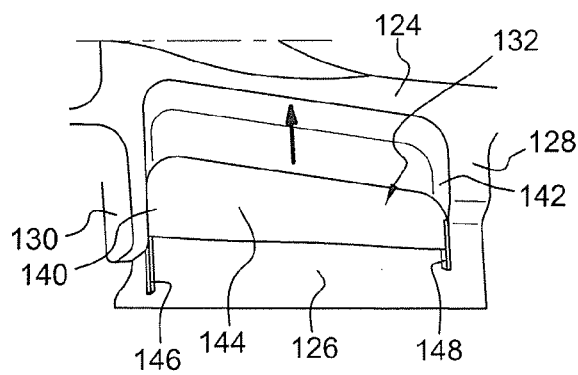
FIG. 6 is a side schematic view, in perspective, of the sequence of mounting operations of a sealing and vibration damping member into an inter-blade cavity.
Figure 7:
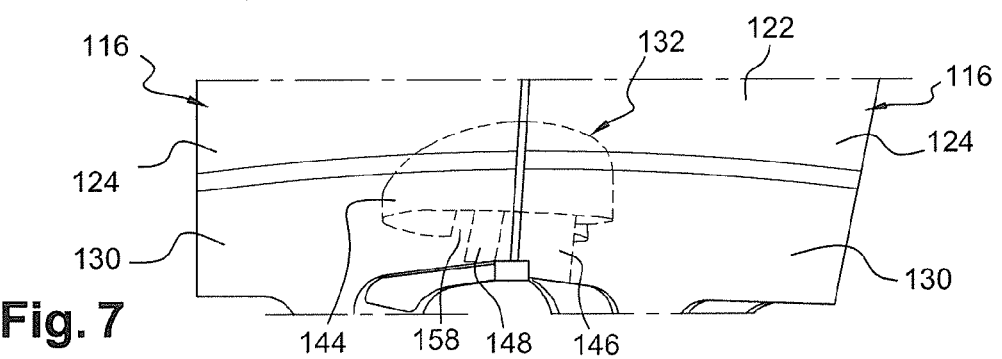
FIG. 7 is a schematic view from upstream of a sealing and vibration damping member according to the invention accommodated in an inter-blade cavity.

In another embodiment, the slots 158 may be straight as shown in FIG. 7. It should also be noted that the upstream 140 and downstream 142 portions may have no slot, as shown in FIGS. 5 and 6.

To mount each member 132 into a cavity, the lugs 146, 148 are pressed against each other and the member 132 is then radially inserted into a cavity until the bottom wall 135 comes in contact with an inner face of two adjacent platforms. The elastic lugs 146, 148 are so configured as to exert a pressure onto the upstream radial walls 130 and on the downstream radial walls, in mounting position. Using a member 132 according to the invention makes it possible to eliminate the holding pins of the prior art.

More specifically, the first lug 146 is supported by two adjacent upstream radial walls 130 so as to cover the gap between these. Similarly, the second lug 148 is supported by two adjacent downstream radial walls so as to cover the gap between these. Such position of the first and second lugs 146, 148 makes it possible to enhance sealing between the upstream and downstream radial walls.

What is claimed is:

1. A turbine wheel for a turbine engine, the turbine wheel comprising a disk carrying blades each having a platform, carrying an impeller connected by a stilt to a root, with each blade comprising an upstream radial wall and a downstream radial wall extending inwards from the platform of the blade, with the roots of the blades being engaged into slots on the periphery of the disk, so that the radial walls of the blades and the platforms of the blades are circumferentially arranged end-to-end, and define inter-blade cavities radially inside the platforms each accommodating an inter-blade sealing and vibration damping member, wherein at least one member comprises a flanged edge extending inwards from a bottom wall applied to radially inner faces of the platforms, with the flanged edge comprising at least two opposite flanks, two end portions which join the flanks, and two elastically deformable upstream and downstream lugs facing each other, each formed in between two notches on each end portion, each lug being elastically prestressed against the upstream and downstream radial walls of a cavity in said member mounting position, a first lug protrudes radially inwards from the upstream end portion of the flanged edge and a second lug protrudes radially inwards from the downstream end portion of the flanged edge.

2. The turbine wheel according to claim 1, wherein the first lug and the second lug respectively cover a junction between the adjacent upstream radial walls and a junction between two adjacent downstream radial walls.

3. The turbine wheel according to claim 1, wherein the upstream portion and the downstream portion of the flanged edge of the member each comprise two slots radially opening inwards and respectively formed on opposite sides of each of the first and second lugs.

4. A turbine engine comprising a turbine, the turbine comprising at least one turbine wheel according to claim 1.

5. A sealing and vibration damping member comprising a bottom wall and extending inwards from the bottom wall, the flanged edge a flanged edge having two opposite flanks and two end portions which join the flanks and which each carries an elastically deformable lug extending opposite the bottom wall from the flanged edge, said end portions each comprising two notches formed adjacent to and on opposite sides of the lugs, wherein the first lug protrudes from the upstream end portion of the flanged edge opposite of the bottom wall and the second lug protrudes from the downstream end portion of the flanged edge opposite of the bottom wall.

* * * * *